United States Patent [19]

Stern

[11] Patent Number: 5,570,414
[45] Date of Patent: Oct. 29, 1996

[54] VOICE MESSAGE KEEPSAKE SYSTEM

[75] Inventor: Geoffrey S. Stern, Westport, Conn.

[73] Assignee: Starbro Communications, Inc., Westport, Conn.

[21] Appl. No.: 586,599

[22] Filed: Jan. 16, 1996

Related U.S. Application Data

[62] Division of Ser. No. 371,755, Jan. 12, 1995, Pat. No. 5,490,206, which is a division of Ser. No. 94,292, Jul. 19, 1993, Pat. No. 5,425,078.

[51] Int. Cl.$^6$ ................................... H04M 1/64
[52] U.S. Cl. ................... 379/67; 379/88; 379/89; 364/468.24
[58] Field of Search ................... 379/67, 71, 72, 379/88, 89, 63, 357, 355, 91, 144; 380/23, 24, 25; 381/190; 40/124.1, 455, 902; 360/1, 27; 364/468

[56] References Cited

U.S. PATENT DOCUMENTS

| | | | |
|---|---|---|---|
| 4,528,643 | 7/1985 | Freeny, Jr. | 364/468 |
| 4,827,512 | 5/1989 | Hirokawa et al. | 380/23 |
| 5,063,698 | 11/1991 | Johnson et al. | 40/124.1 |
| 5,166,851 | 11/1992 | Jacobson | 360/137 |
| 5,251,251 | 10/1993 | Barber et al. | 379/67 |

*Primary Examiner*—Krista M. Zele
*Assistant Examiner*—Scott Wolinsky
*Attorney, Agent, or Firm*—Darby & Darby, P.C.

[57] ABSTRACT

A system for producing voice message keepsakes includes a message processor which may be accessed over a plurality of communication links, such as telephone lines. The processor may be so accessed by a customer's communication set, such as a conventional telephone set, or by a subscriber set, and it is capable of distinguishing the two. When accessed by a customer's set, the processor permits the caller to create a temporary mailbox associated with his gift purchase, in which he may then record a voice message. When called by a subscriber set, the processor permits previously created mailboxes to be accessed and will transfer the message recorded therein to the subscriber set. The subscriber set includes a receptacle for receiving a voice message keepsake in accordance with the present invention, and it will record thereon stored messages provided from the message processor, under control of the message processor. The invention also contemplates a unique construction for the voice message keepsake, and a method for recording on it.

8 Claims, 6 Drawing Sheets

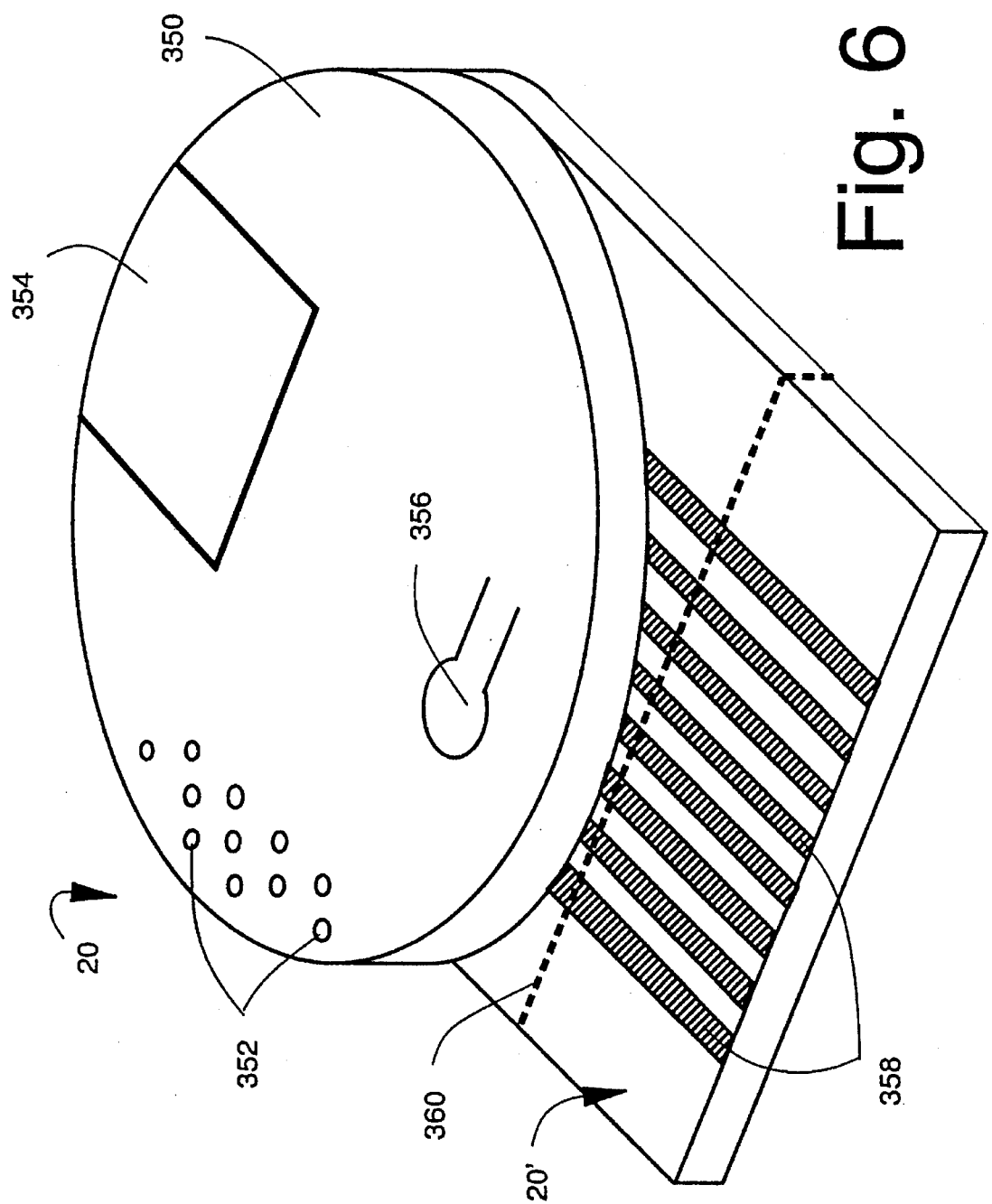

VOICE MESSAGE KEEPSAKE SYSTEM

This is a divisional of application Ser. No. 08/371,755, filed Jan. 12, 1995, issued Feb. 6, 1996 as U.S. Pat. No. 5,490,206, which is a divisional of application Ser. No. 08/094,292 filed Jul. 19, 1993, issued on Jun. 13, 1995 as U.S. Pat. No. 5,425,078.

FIELD OF THE INVENTION

The present invention relates to a personalized keepsake for use in association with gifts and greeting cards to selectively deliver a personalized voice recording from the gift giver. The invention also relates to a method and system for producing the voice recording in a commercial environment.

BACKGROUND OF THE INVENTION

Modern life finds family members and loved ones often separated by great distances. Modern technology has made communication very convenient, and toll free numbers and automated order-taking services have made gift purchasing very convenient, especially when the recipient is far away. However, it has also resulted in gift giving having lost much of its personal, creative and romantic aspects. The modern gift giver may never touch or even see the gift he sends. The gift may be selected from a catalog, or flowers may be ordered from a group of "standard" arrangements. Also, a personal message delivered with a gift may be written by a retailer on a stock card and delivered by a total stranger. It would be highly desirable to restore the excitement and personal involvement in giving a gift, without reintroducing all of the inconveniences eliminated by modern order-taking technologies.

Towards this end, Johnson et al. U.S. Pat. No. 5,063,698 teaches that a greeting card be provided with voice synthesizing circuitry. This circuitry receives a pre-recorded solid state memory chip which contains a digitally encoded voice message that may be played back. In accordance with this patent, the gift giver calls an answering machine at a central location and records his message. Personnel at the central location then encode the recorded voice message in digital form and record the encoded message on the memory chip, which is subsequently inserted into the circuitry of the greeting card.

The system disclosed in the Johnson et al. patent, although it may be adequate for use at the point of purchase, has a number of serious shortcomings. First of all, it requires a substantial amount of handling of a memory chip on which a message has been recorded. This is undesirable, because electronic chips are subject to being damaged by handling, particularly as a result of static electricity, and the recorded message may accidentally be impaired or lost. Also, the system requires the assembly of the memory chip to the circuitry within the card, and this process is subject to errors, which can result in the failure of the recorded message to playback and, possible, in damage to the equipment.

Furthermore, the system of the Johnson et al. patent requires the voice message to be recorded on the memory chip at the location of the answering machine. In accordance with modern order-taking systems, the gift giver would typically call a local number or an "800" number in order to purchase a gift. On the other hand, the fulfillment of the gift order would typically occur at a location close to the recipient, at a "fulfillment" center, and the fulfillment center would typically be remote from both the gift giver and the location of the answering machine. It would therefore be necessary to transport the recorded memory chip from the location of the answering machine to the location of the fulfillment center. This not only involves undesirable delay and the additional cost of transportation, but could result in damage to the chip during transportation. Accordingly, the system of the Johnson et al. patent is not a feasible one for use in conjunction with modern order-taking systems.

Broadly, it is an object of the present invention to provide a voice message keepsake and a system for recording the same, which do not suffer from the shortcomings of known keepsakes and systems of this type. It is specifically contemplated that the voice message keepsake and system of the present invention should not require handling or transportation of delicate integrated circuit chips and should be capable of convenient use in conjunction with modern order-taking systems.

It is also an object of the present invention to provide a system for recording voice message keepsakes which would permit the customer to record a voice message at a first location and would further permit the voice message to be recorded on the voice message keepsake at a second location remote from the first location.

It is also an object of the present invention to provide a voice message keepsake and a system for producing the same which are reliable and convenient in use, yet relatively inexpensive, so that a voice message keepsake may be added to a gift, without appreciably increasing the cost of the gift.

In accordance with the present invention, a system for producing voice message keepsakes includes a message processor which may be accessed over a plurality of communication links, such as telephone lines. The processor may be so accessed by means of a customer's communication set, such as a conventional telephone set, or by means of a subscriber set, and it is capable of distinguishing the two. When accessed by a customer's set, the processor permits the caller to create a temporary mailbox associated with his gift purchase, in which he may then record a voice message. When called by a subscriber set, the processor permits previously created mailboxes to be accessed and will transfer the message recorded therein to the subscriber set. The subscriber set includes a receptacle for receiving a voice message keepsake in accordance with the present invention, and it will record thereon stored messages provided from the message processor, under control of the message processor.

A voice message keepsake in accordance with the present invention includes an integrated circuit which is a single chip voice message system. In the preferred embodiment, this voice message system permits recordation and playback of messages under the power of a battery which is included on the same circuit board as the chip, and a miniature speaker included on the circuit board permits the voice message to be heard. The voice message keepsake retains the recorded message in non-volatile form, and the entire voice message keepsake is contained in a housing which encloses the circuit board. An edge of the circuit board protrudes from this housing and permits the voice message keepsake to be plugged into a subscriber set. However, once the voice message is recorded, the protruding contact portion may be cut or broken away.

BRIEF DESCRIPTION OF THE DRAWINGS

The foregoing brief description, as well as further objects, features, and advantages of the present invention will be understood more completely from the following detailed description of a presently preferred, but nonetheless illustrative, embodiment, with reference being had to the accompanying drawings in which:

FIG. 6 is a perspective view, on an enlarged scale illustrating the presently preferred structure of a voice message keepsake in accordance with the present invention.

DETAILED DESCRIPTION OF THE PREFERRED EMBODIMENT

Figure 1:
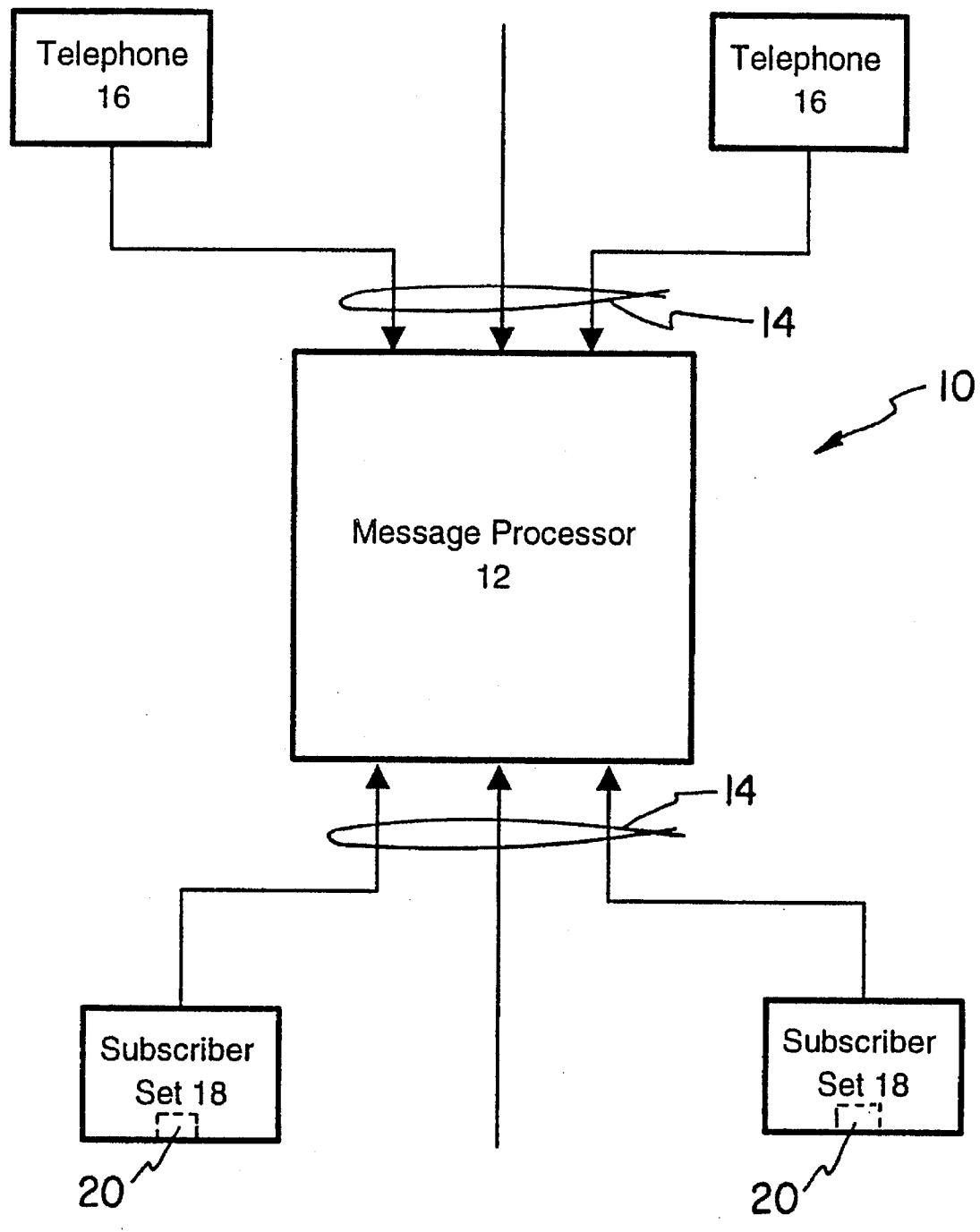
FIG. 1 is a functional block diagram of a voice message keepsake recording system in accordance with the present invention.

Turning now to the details of the drawing, FIG. 1 is schematic block diagram illustrating a system 10 incorporating objects and features of the invention. System 10 includes a message processor 12 which handles a plurality of telephone lines 14. Each of the telephone lines 14 may be accessed either via a conventional pushbutton telephone 16 or a subscriber set 18 in accordance with the present invention. It is, however, foreseen that system 10 could operate with rotary telephones, as will be described further below. The telephone lines 14 are accessed in the manner of a conventional telephone connection by dialing predefined telephone numbers. Message processor 12 is able to distinguish between telephone sets and subscriber sets by virtue of special identifying signals produced by the subscriber sets. The message processor will therefore deliver different voice mail menus depending upon whether a telephone set or subscriber set is detected.

In operation, conventional telephone calls would be received from customers and subscriber set calls would be received from vendors for voice message keepsakes. When a customer purchases a gift and wishes to include a voice message keepsake, the sales representative would provide the customer with an identification code associated with the particular gift. If the gift was ordered from a telephone sales representative, that representative could transfer the customer's call directly, after calling the message processor and dialing in the identification code involved in the particular transaction. In any event, the message processor will present a voice mail menu to the customer which will either request an identification code (if none has been provided) or prompt for a voice message to be recorded. The message processor will then create a temporary voice mailbox associated with the identification code and will store the customer's voice message in that mailbox. In order to accommodate rotary dial phones, the message processor could be made responsive to numbers pronounced by the customer, as is now conventional in some voice mail systems, instead of responding only to tones coded in on the telephone keypad.

Subsequently, a vendor may call a message processor utilizing a subscriber set 18, and he will receive a subscriber's voice mail menu. Upon being provided with a customer identification code for which a message has been recorded, message processor 12 will access the corresponding voice mailbox, extract the recorded message, and signal the subscriber's set that a voice message is about to be transmitted. When it receives such signal from the message processor, the subscriber set 18, which has been previously provided with a blank, removable voice message keepsake 20, begins to record the customer's voice message on the keepsake. Upon completion of the recording process, the keepsake 20 may be detached from the subscriber set 18 and secured to the corresponding gift.

When the gift is received by the ultimate recipient, he or she will be able to play the recorded voice message at will by simply pressing a "start" button.

Message processor 12 is preferably realized with a VMX300 processor operating under the program called VMXworks™, both of which are available from VMX Inc. of San Jose, Calif. This combination provides the basic voice mail system, including call handling, voicemail menus, and temporary voice mailbox creation. This system is customized for the purposes of the present application as described further below.

Figure 2:
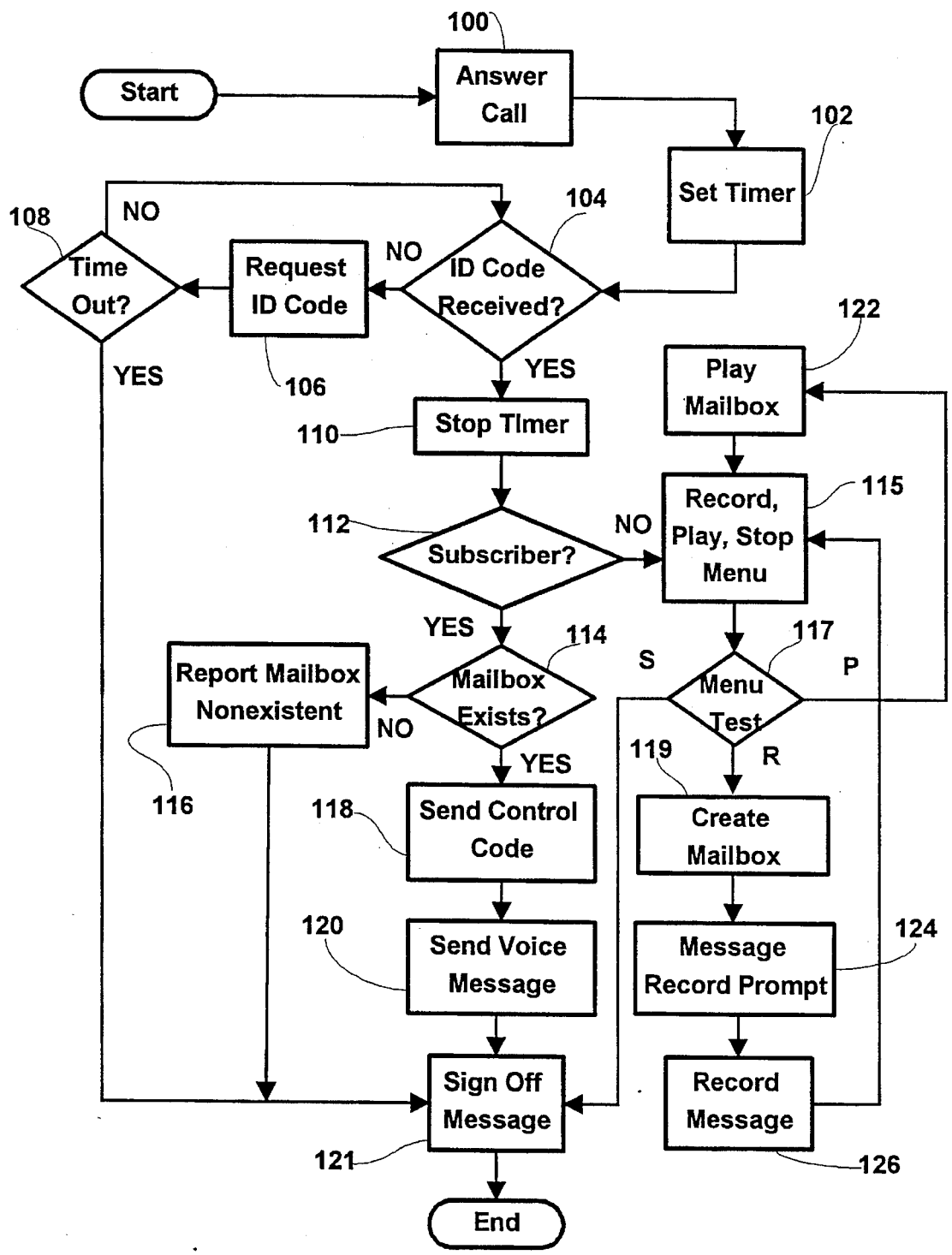
FIG. 2 is a flow chart illustrating the operation of a message processor in accordance with the preferred embodiment of the present invention.

FIG. 2 is flow chart illustrating the operation of message processor 12 in accordance with the present invention. Processor 12 answers an incoming call at block 100 and is able to determine whether it is a call coming from a telephone set or a subscriber set, based upon special messages provided by a subscriber set (for example, a unique series of DTMF tones). At this point, processor 12 provides a introductory voice mail message advising the caller that he has reached the message processing center.

At block 102, a countdown timer is set to a predetermined time. This timer is intended to give the caller a reasonable opportunity to provide an identification code, and he is disconnected in the event that he fails to do so. This is achieved in accordance with the steps that follow immediately. At block 104, a test is performed to determine whether an identification code has been received. If not, a voice prompt is provided requesting an identification code at block 106. A test is then performed at block 108 to determine whether the timer has timed out and, if so, a sign off message is generated at block 121, the program is terminated and the call is disconnected. If the timer has not timed out, control returns to block 104 and the sequence of steps in blocks 104, 106 and 108 is repeated until an identification code is received at block 104, at which time control transfers from block 104 to block 110, and the timer is stopped.

As previously mentioned, processor 12 is already aware whether or not the received call is from a subscriber. At block 112, a test is made to determine whether or not the call is from a subscriber. If it is from a subscriber, control is transferred to block 114 and, if it is not, control is transferred to block 115.

Block 114 begins the processing portion performed for subscribers. At this block, a test is performed to determine whether or not a mailbox has been opened with respect to the provided identification code. If not, a message is provided at block 116 advising that the mailbox has not yet been opened, a sign off message is generated at block 121 and the program terminates. If the mailbox has been opened, a control code, preferably in the form of a special combination of DTMF tones, is transmitted to the subscriber set at block 118. This control code readies the subscriber set for recording of the voice message keepsake, and the voice message itself is transmitted to the subscriber set at block 120.

The program ends after a sign off message is generated at block 121. It is contemplated that some subscriber sets may be provided with the ability to record a plurality or a bank of voice message keepsakes. The operation of processor 12 could then be modified to provide a further menu before block 121 which would return control to block 102 if the subscriber wished to perform another transaction.

At block 115, processor 12 provides the customer with a verbal menu having three choices:

1. Record a message,
2. Play back a message, or
3. Terminate, instructing the customer to depress an appropriate key, or pronounce a given control word for each choice. At block 117, a test is performed to determine which menu choice was made by the user, with control transferring to block 119 if recordation of a message was requested, block 122 if playback was requested, and generation of a sign off message at block 121, followed by termination of the program if termination was requested.

At block 122, the message recorded in the corresponding mailbox is played back, and control is transferred back to block 115.

At block 119, a mailbox is created with respect to the corresponding identification code. Then, at block 124, the customer is prompted verbally and instructed to begin speaking the message to be recorded "at the sound of the beep." Next, at block 126, recording of the voice message begins. After completion of the message or upon the termination of a prescribed time interval, control is returned to block 115.

Figure 3:
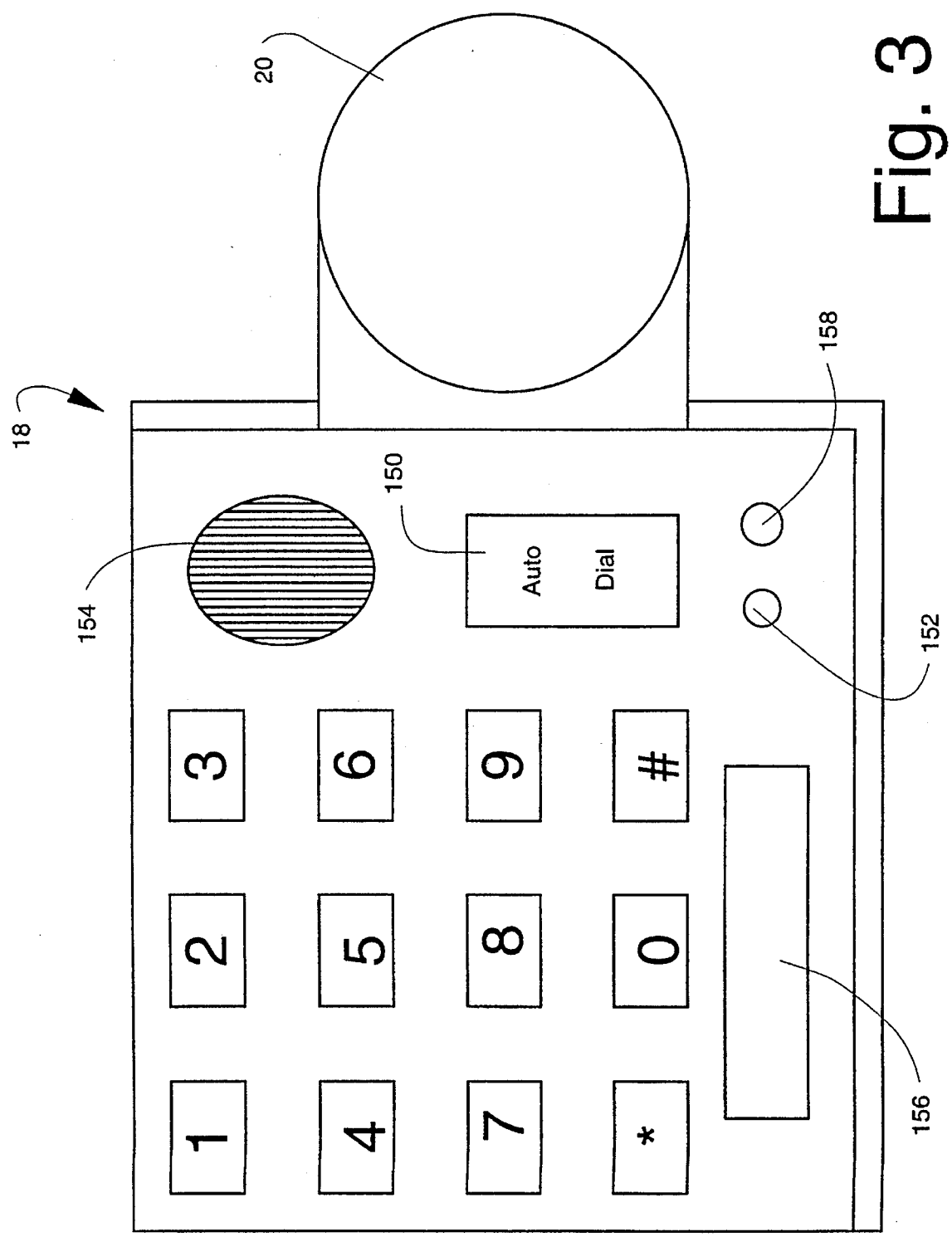
FIG. 3 is a schematic representation of a subscriber set in accordance with the preferred embodiment of the present invention.

FIG. 3 is a schematic representation of a subscriber set 18 in accordance with the present invention. This subscriber set combines the functions of a conventional push-button telephone with a special circuit board including a receptacle for receiving voice recording keepsakes and circuitry for operating the same to record a message thereon. In addition, subscriber set 18 includes processing circuitry controlling the cooperation of the telephone components and recording components.

In operation, a subscriber prepares for voice recording by plugging a blank keepsake 20 into the subscriber set 18. He then keys in the customer's identification code, utilizing the pushbutton keypad, whereupon he presses a button key 150.

If the subscriber has set up the subscriber set properly, the set will automatically dial message processor 12 (the telephone number of the processor would have been programmed into the subscriber set previously), and then recording onto the keepsake would proceed automatically. If the subscriber had not set up the subscriber set properly, as by forgetting to plug a keepsake thereinto or forgetting to code in the user's identification code, the subscriber would be prompted verbally through a speaker 154 and visually via an LCD display 156 by the subscriber set to set up properly. The subscriber would be aware that he had connected with message processor 12 by receiving an announcement upon the connection being established, and he would be aware when voice recording begins by virtue of the illumination of a light emitting diode (LED) 158. In addition, he would know when voice recording is completed as a result of having received the sign off message provided by the message processor. Also, after disconnecting from the message processor, the subscriber may press button 152 on the subscriber set, whereupon the message recorded on keepsake 20 would be played back, thereby providing assurance that a proper recording had been made.

Figure 4:
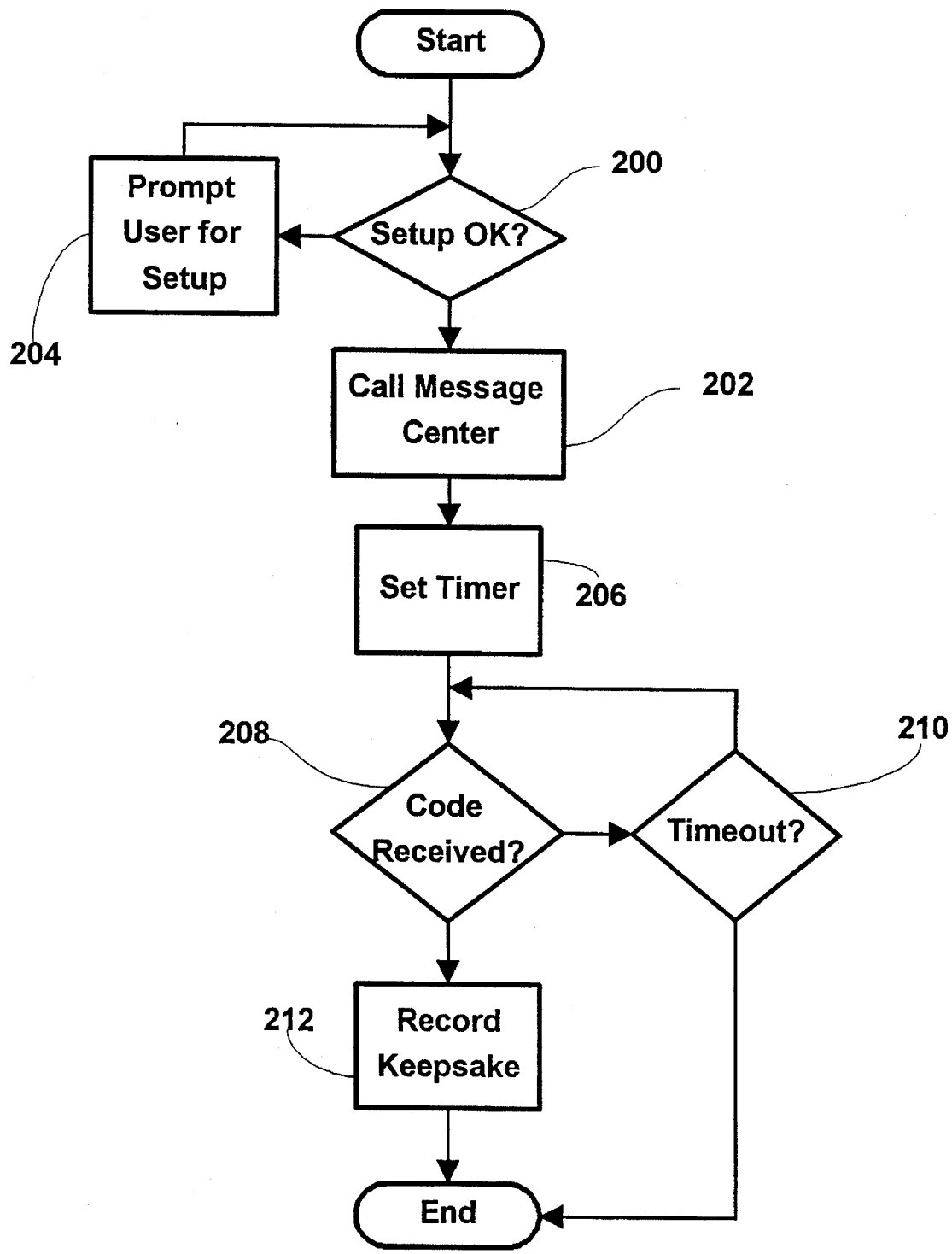
FIG. 4 is a flow chart illustrating the operation of the subscriber set in communicating with and recording a message from the message processor.

FIG. 4 is a flow chart illustrating the operation of subscriber set 18. Operation is started when button key 150 is depressed. At block 200, a test is performed to determine whether or not the subscriber set has been set up properly. This may be an overall test or a separate test for each aspect of the set up. The minimum test would be to test for the presence of a keepsake, and this could be achieved by using a simple switch or sensor. If set up is proper, control transfers to block 202 and, if not, to block 204. At block 204, the user is prompted to set up the subscriber's set properly. If a general message is provided, it would simply instruct him that proper set up has not occurred. On the other hand, if specific tests had been performed, it would also be possible to provide separate prompts for each aspect of the set up. Such diagnostic routines are conventional and well-understood by those skilled in the art. After delivery of an appropriate message, control returns to block 200.

At block 202, subscriber set 18 calls message processor 12, utilizing a telephone number which has been programmed into it previously.

At block 206, a decreasing timer is set to a predetermined time, and control transfers to block 208, at which a test is performed to determine whether or not the control code to begin recording has been received. If the control code has not been received, a test is performed at block 210 to determine whether or not the timer has timed out. If so, processing ends and the subscriber set disconnects from the message processor. If no time out has occurred, the test at block 208 is repeated, until the code is received. Recording of the voice message onto the keepsake then occurs at block 212. After a prescribed time or upon the receipt of an appropriate code from message processor 12, subscriber unit 18 disconnects and processing terminates.

Figure 5:
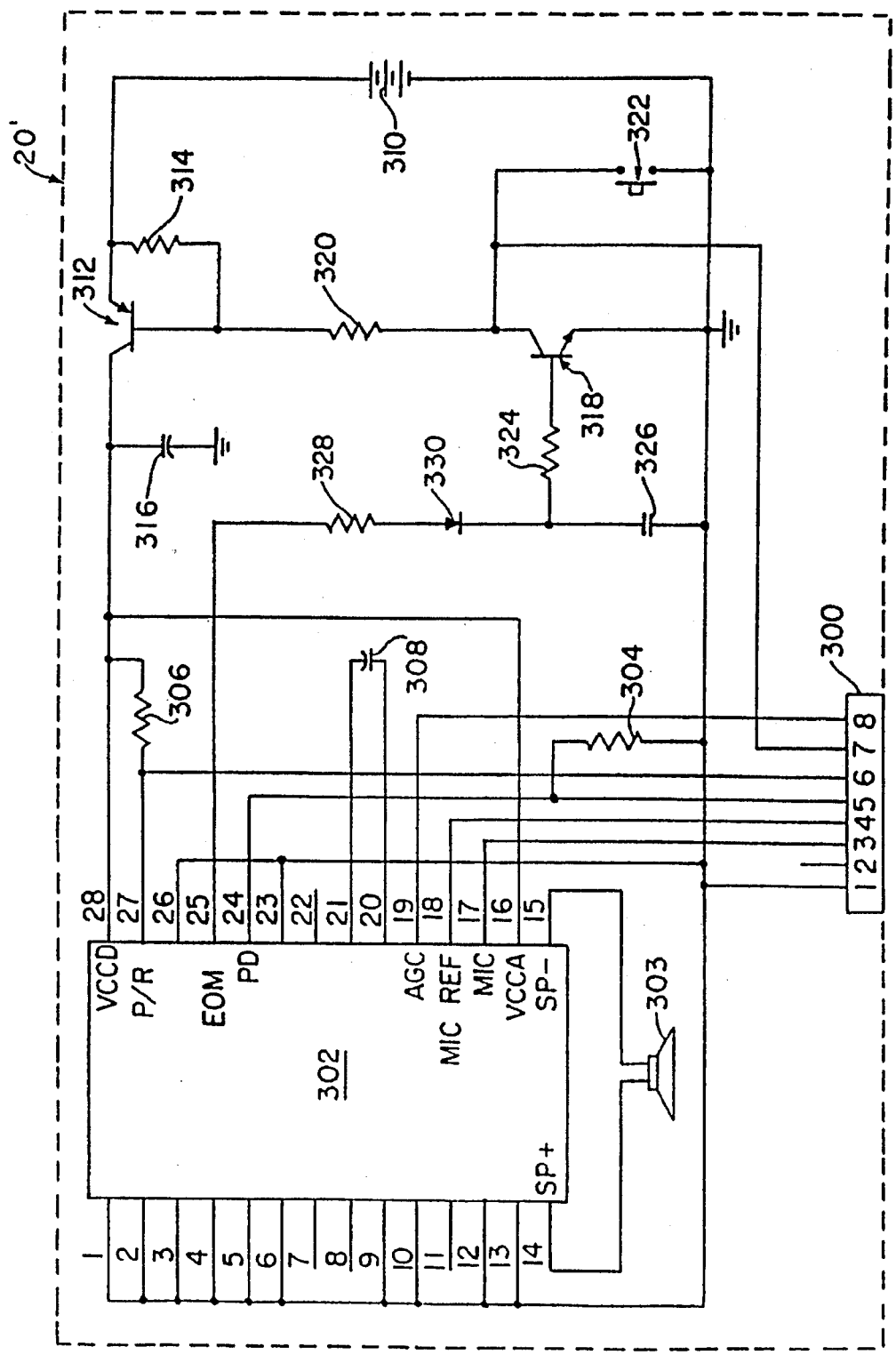
FIG. 5 is a schematic diagram of a preferred embodiment of a voice message keepsake in accordance with the present invention.

FIG. 5 is a simplified schematic diagram of a preferred embodiment of a voice message keepsake 20 in accordance with the present invention. Preferably, the device will be fabricated as a hybrid circuit on a circuit board less than by 2×2 inches in size. The circuit board would be provided with an appropriate connector, for example, an 8 bend edge connector, designed to fit in a receptacle in subscriber unit 18.

At the heart of the keepsake 20 is an integrated circuit 302, which is a single chip voice messages system, preferably an ISD 1020 chip available from Information Storage Devices, Inc. of San Jose, Calif. This device is capable of direct storage of analog signals on the chip and playback at will under electronic control. Furthermore, storage is non-volatile, so a stored message is retained indefinitely, without the need for a power supply. Pins 1–13, 22, 23, and 26 of chip 302 are not utilized in the present application and, of these, pins 1–6 and 9–13, 23 and 26 are returned to ground.

All of the circuitry of keepsake 20 is mounted on a circuit board 20' of conventional design. The circuit board also includes part of a conventional connector 300 (e.g. the fingers of an edge connector) and a mounting for a conventional disk-type battery (6 volts) 310. A miniature 16 ohm speaker 303, which is mounted on circuit board 20' is connected between terminals 14 and 15 of the chip. Pin 16 is the power input for the analog circuits in chip 302 and is connected to power supply circuitry to be described below.

Pins 17 and 18 are designed to have a microphone connected between them. These pins are connected to terminals 3 and 4, respectively, of connector 300. Pin 19 is provided for the external connection of components to control, the characteristics of automatic gain control, which is used during recording (AGC). This pin connected to terminal 8 of connector 300 and, when keepsake 20 is plugged into subscriber unit 18, a capacitor and resistor on that unit are connected in parallel between pin 19 and ground. The values of the capacitor and resistor are selected in accordance with the chip manufacturer's specifications in order to achieve specific, desired AGC characteristics. This avoids the need to supply these components on each chip. A capacitor 308 is connected between pins 20 and 21, again in accordance with the manufacturer's specifications for proper operation of the circuitry.

Pin 24 permits application of a signal to power down the chip, and this pin is connected to terminal 5 of connector 300. This pin is also connected to ground through a pull-down resistor 304. Pin 25 produces a signal which is normally high and goes low during playback upon the occurrence of a end of message (EOM). Terminal 27 is a control terminal which permits the chip to be placed into either a play or record mode, with the play mode being selected when the level of the signal applied to this pin is high, and the record mode is selected when the signal level is low. This pin is connected to the powering circuitry described below through a pull-up resistor 306. Pin 28 is the power input for the digital components within chip 302 and is connected to the powering circuitry described further below.

A disk-type battery 310 is removably mounted on circuit board 20' so that its negative terminal is connected to ground. The powering circuit mentioned previously includes a PNP driving transistor 312, the emitter of which is connected to the positive terminal of battery 310. A resistor 314 is connected between the emitter and base of a PNP driving transistor 312, and the collector of the transistor is connected to terminals 16 and 28 of integrated circuit 302. A relatively large capacitor 316 (about 20 mf) is connected between the collector of transistor 312 and ground. An NPN driving transistor 318 has its collector connected to the base of transistor 312 to a resistor 320. The collector of transistor 318 is also connected to terminal 7 of the connector 300 and to one side of a manually operated pushbutton switch 322, the other side of which is connected to ground. The emitter of transistor 318 is returned to ground. The base of transistor 318 is also connected to ground through a resistor 324 and a capacitor 326, the junction between which is connected to pin 25 of integrated circuit 302 through a resistor 328 and a diode 330.

In operation, transistor 318 will normally be off when integrated circuit 302 is not playing back or recording. This causes transistor 312 to be off, so that no power is provided to integrated circuit 302, and there is essentially no drain on battery 310. Chip 302 can be activated by grounding the collector of transistor 318. This can be achieved by the customer by depressing pushbutton switch 322. Alternately when keepsake 20 is plugged into a subscriber set, the subscriber set will provide the necessary grounding. In either case, this produces a voltage drop across resistor 314 which biases transistor 312 into the on condition. As a result, capacitor 316 is charged to the nominal supply voltage and powers on chip 302.

As soon as chip 302 is powered on, the EOM signal on pin 25 goes high and begins charging capacitor 326 through resistor 328 and diode 330. Eventually capacitor 326 is charged to a voltage which biases resistor 318 into the on condition, which, in turn, provides driving current to sustain transistor 318 in the on condition, after the short circuit at the collector of transistor 318 is removed. Integrated circuit 302 will therefore remain powered by the powering circuitry so long as the EOM signal on pin 25 remains high. This EOM signal will, however, go low after playback of a recorded message is completed. This will cause diode 330 to become reverse bias, so that capacitor 326 discharges through resistor 324 and the base-emitter junction of transistor 318. Eventually, the charge on capacitor 326 reaches such a low state that transistor 318 can no longer be maintained in its on condition. When transistor 318 turns off, the drive to transistor 312 is removed and it, also, turns off. The power to chip 302 is therefore removed and battery 310 is isolated therefrom.

When keepsake 20 is plugged into the subscriber terminal 18, the terminal can control whether the keepsake is recording or playing back by controlling the level of the signal on pin 6 of the connector 300 which, in turn controls the level of the signal applied to pin 27. It will be recalled that a high level causes playback and a low level recording. In addition, subscriber set 18 can cause the keepsake 20 to go to a low power or standby state at any time by applying a high level to pin 16 of connector 300. This results in a high level being applied to pin 24 of chip 302, which causes the chip to power down. When subscriber set 18 causes keepsake 20 to record a message, the desired message, as received from the message processor 12, is applied between pins 3 and 4 of connector 300. This causes the voice information to be applied between pins 17 and 18 of chip 302 which are the microphone input pins. During playback, a recorded message is provided to speaker 303 from pins 14 and 15 of chip 302.

FIG. 6 is a perspective view of a preferred embodiment of a voice message keepsake 20 in accordance with the present invention. The device is generally disk shaped, approximately two inches in diameter, and appropriately one-quarter inch high. It includes the circuit board 20' described above, and a disk-shaped cover 350, preferably made of plastic and securely attached to the circuit board 20'. This cover protects the circuits inside when keepsake 20 is handled. A plurality of holes 352 are provided in cover 350 above the location of speaker 303, to permit convenient listening to playback of the keepsake. In addition, a removable door 354 is provided in cover 350, to permit access to battery 310, for replacement. A tongue 356 is formed as a cut-out in the top of cover 350 and is positioned over the location of switch 322. By applying downward pressure on tongue 356, it can be deformed inwardly, depressing switch 322.

As is conventional, circuit board 20' is formed with a plurality of conductive stripes 358 which extend out to the edge of the board and serve as contacts to permit electrical connections to be made to the board. Subscriber unit 18 can then conveniently be provided with a conventional card edge connector, which receives and engages the conductive strips 358 when the edge of circuit board 20' is inserted into the subscriber unit card edge connector. Inasmuch as the conductive stripes 358 are not needed after the voice message keepsake 20 has been recorded (the keepsake would only be played back thereafter), circuit board 20' is provided with a weakened or frangible section 360 that extends across the board at a distance from its end, to permit the portion of the board containing the stripes 358 to be broken away from the remainder of the board. Keepsake 20 could then be handled without danger of erasing or damaging the voice message, and it could conveniently be concealed in a gift or greeting card.

Although a preferred embodiment of the invention has been disclosed for illustrative purposes, those skilled in the art will appreciate that many additions, modifications, and substitutions are possible, without departing from the scope and spirit of the invention as defined by the accompanying claims.

What is claimed is:

1. In a system for recording a purchasing customer's voice message in a voice message keepsake provided by a vendor, the combination of:

a voice message processor comprising:

a plurality of communication links capable of receiving calls transmitted over a public communication network; and recording means responsive to receipt of a customer's call on one of said communication links for recording the customer's voice message in association with a code provided by the customer; and a subscriber set co-located with said vendor and remote from said message processor, comprising;

means for communicating with said message processor via one of said communication links to receive voice messages previously recorded by said recording means; and keepsake recording means electrically communicating with said means for communicating and said voice message keepsake for recording thereon a voice message received by said means for communicating.

2. The system of claim 1, wherein at least one of said communication links is connected to a conventional telephone line.

3. The system of claim 2, wherein said recording means includes means for creating a temporary voice message mailbox associated with the code wherein the customer's voice message is stored.

4. The system of claim 3, wherein said subscriber set further comprises means for removably connecting a voice message keepsake thereto and for providing an electrical connection therebetween.

5. The system of claim 1, further comprising a keepsake capable of having a voice message recorded thereon and selectively played back, comprising, on a single supporting structure:

an integrated voice message circuit including means responsive to a control signal for storing a voice message in electronic form and means responsive to a control signal for playing back a stored message stored by said means for storing;

means for reproducing a played back voice message in audible form;

connection means for providing said storing and playing back control signals to said circuit; and manually operable control means coupled to said circuit for producing a playing back control signal in place of said signals provided via said connection means.

6. A keepsake in accordance with claim 5, further comprising battery holding means for removably receiving and retaining a battery, and electronic means responsive to a supervisory signal from said connection means for selectively providing an electrical connection between said battery holding means and said circuit.

7. A keepsake in accordance with claim 6, wherein said electronic means is also responsive to the conclusion of a played back message for terminating said electrical connection.

8. For use in a system for recording a purchasing customer's voice message in a voice message keepsake provided by a vendor, a method for providing a customer's voice recording on said keepsake, comprising the steps of:

at a first location, providing a plurality of communication links to a public communication network for use by customers and vendors;

responsive to receipt of a customer's call on one of said communication links, recording the customer's voice message at said first location in association with a code provided by the customer;

responsive to receipt of a vendor's call on one of said communication links, transmitting over the vendor's communication link at least one recorded customer voice message; and at the location of said calling vendor and remote from said first location, recording in said keepsake a recorded customer voice message received from said first location via one of said communication links.

* * * * *